US008224936B2

(12) United States Patent  
Ford et al.

(10) Patent No.: US 8,224,936 B2  
(45) Date of Patent: Jul. 17, 2012

(54) CONFIGURATION FILE OVERRIDE

(75) Inventors: Alan Ford, New South Wales (AU); Steve Lee, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 618 days.

(21) Appl. No.: 12/125,000

(22) Filed: May 21, 2008

(65) Prior Publication Data

US 2009/0292795 A1    Nov. 26, 2009

(51) Int. Cl.  
G06F 15/177   (2006.01)

(52) U.S. Cl. ......... 709/222; 709/200; 725/111; 370/392

(58) Field of Classification Search .................. 709/200, 709/222; 725/111; 370/392  
See application file for complete search history.

(56) References Cited

U.S. PATENT DOCUMENTS

| | | | | |
|---|---|---|---|---|
| 5,856,974 A * | 1/1999 | Gervais et al. ............... 370/392 |
| 5,862,451 A * | 1/1999 | Grau et al. .................... 725/116 |
| 6,018,767 A * | 1/2000 | Fijolek et al. ................. 709/218 |
| 6,023,464 A * | 2/2000 | Woundy ........................ 370/352 |
| 6,070,187 A * | 5/2000 | Subramaniam et al. ...... 709/220 |
| 6,233,687 B1 * | 5/2001 | White ............................... 726/3 |
| 6,510,162 B1 * | 1/2003 | Fijolek et al. ................. 370/432 |
| 6,598,057 B1 * | 7/2003 | Synnestvedt et al. .............. 1/1 |
| 6,636,971 B1 * | 10/2003 | Loukianov .................... 713/189 |
| 6,657,991 B1 * | 12/2003 | Akgun et al. ................. 370/352 |
| 6,715,075 B1 * | 3/2004 | Loukianov .................... 713/176 |
| 6,742,187 B1 * | 5/2004 | Vogel ............................ 725/126 |
| 6,754,622 B1 * | 6/2004 | Beser et al. ................... 704/226 |
| 6,802,032 B1 * | 10/2004 | Budinger et al. ............... 714/46 |
| 6,839,829 B1 * | 1/2005 | Daruwalla et al. ............. 712/28 |
| 6,857,009 B1 * | 2/2005 | Ferreria et al. ................ 709/219 |
| 6,859,826 B2 * | 2/2005 | Bahlmann ..................... 709/220 |
| 6,917,591 B2 * | 7/2005 | St. John ........................ 370/235 |
| 6,986,157 B1 * | 1/2006 | Fijolek et al. ................. 725/111 |
| 7,058,007 B1 * | 6/2006 | Daruwalla et al. ............ 370/216 |
| 7,080,400 B1 * | 7/2006 | Navar ............................ 725/139 |
| 7,114,070 B1 * | 9/2006 | Willming et al. ............. 713/156 |
| 7,152,117 B1 * | 12/2006 | Stapp et al. .................... 709/245 |
| 7,227,889 B1 * | 6/2007 | Roeck et al. .................. 375/222 |
| 7,272,846 B2 | 9/2007 | Williams et al. |
| 7,293,078 B2 * | 11/2007 | Danforth ....................... 709/222 |
| 7,293,282 B2 * | 11/2007 | Danforth et al. .................. 726/4 |
| 7,305,460 B2 * | 12/2007 | Park ............................... 709/222 |
| 7,334,252 B1 * | 2/2008 | Millet et al. .................. 725/111 |
| 7,334,258 B1 * | 2/2008 | Ford et al. ......................... 726/4 |
| 7,512,969 B2 | 3/2009 | Gould et al. |
| 7,539,193 B2 * | 5/2009 | Pfeffer et al. ................. 370/392 |

(Continued)

OTHER PUBLICATIONS

Eyermann et al., EP 1848150B1, "Method and apparatus for hiding network topology", Apr. 20, 2006.*

(Continued)

Primary Examiner — John Follansbee  
Assistant Examiner — Anthony Mejia  
(74) Attorney, Agent, or Firm — Stolowitz Ford Cowger LLP

(57) ABSTRACT

In one embodiment, a router is configured to relay a provisioning request originating from a remote network device to a remote provisioning server. When the router receives back a provisioning response including provisioning information identifying a first remotely stored configuration file, the router is configured to modify the provisioning information such that the modified provisioning information no longer identifies the first remotely stored configuration file. The router then relays the provisioning reply, which may identify a second different configuration file, to the remote network device.

20 Claims, 4 Drawing Sheets

U.S. PATENT DOCUMENTS

| | | | | |
|---|---|---|---|---|
| 7,558,845 | B2* | 7/2009 | Finley et al. | 709/220 |
| 7,600,003 | B1* | 10/2009 | Okmianski et al. | 709/220 |
| 7,606,870 | B2* | 10/2009 | Higgs | 709/216 |
| 7,640,340 | B1* | 12/2009 | Stapp et al. | 709/224 |
| 7,701,956 | B2* | 4/2010 | Howe | 370/401 |
| 7,716,468 | B2 | 5/2010 | Millet et al. | |
| 7,991,863 | B2* | 8/2011 | Zhao | 709/221 |
| 2001/0032311 | A1* | 10/2001 | White | 713/168 |
| 2002/0066110 | A1* | 5/2002 | Cloonan et al. | 725/111 |
| 2002/0101883 | A1* | 8/2002 | Ruszczyk et al. | 370/503 |
| 2002/0178289 | A1* | 11/2002 | Kurose | 709/245 |
| 2003/0070063 | A1* | 4/2003 | Boyle et al. | 713/2 |
| 2004/0123329 | A1* | 6/2004 | Williams et al. | 725/111 |
| 2005/0005154 | A1* | 1/2005 | Danforth et al. | 713/200 |
| 2005/0015810 | A1* | 1/2005 | Gould et al. | 725/111 |
| 2005/0132360 | A1* | 6/2005 | Chu et al. | 717/177 |
| 2005/0286518 | A1* | 12/2005 | Park et al. | 370/389 |
| 2006/0031394 | A1* | 2/2006 | Tazuma | 709/217 |
| 2006/0080537 | A1* | 4/2006 | Yoshizaki | 713/176 |
| 2006/0140164 | A1* | 6/2006 | Patel et al. | 370/338 |
| 2006/0159100 | A1* | 7/2006 | Droms et al. | 370/395.2 |
| 2006/0195611 | A1* | 8/2006 | Howe | 709/245 |
| 2006/0206594 | A1* | 9/2006 | Brown et al. | 709/220 |
| 2007/0061458 | A1* | 3/2007 | Lum | 709/225 |
| 2007/0208932 | A1 | 9/2007 | Millet et al. | |
| 2007/0276943 | A1* | 11/2007 | Marez et al. | 709/225 |
| 2008/0109864 | A1* | 5/2008 | Danforth et al. | 725/111 |
| 2008/0126540 | A1* | 5/2008 | Zeng et al. | 709/225 |
| 2008/0177998 | A1* | 7/2008 | Apsangi et al. | 713/155 |
| 2008/0225749 | A1 | 9/2008 | Peng et al. | |
| 2009/0070800 | A1 | 3/2009 | Gould et al. | |
| 2009/0083406 | A1* | 3/2009 | Harrington et al. | 709/222 |
| 2009/0193129 | A1* | 7/2009 | Agarwal et al. | 709/229 |
| 2009/0198804 | A1* | 8/2009 | Danforth et al. | 709/221 |
| 2009/0213871 | A1* | 8/2009 | Carlson et al. | 370/462 |
| 2009/0282134 | A1* | 11/2009 | Walston et al. | 709/221 |
| 2010/0040055 | A1* | 2/2010 | Ford et al. | 370/389 |

OTHER PUBLICATIONS

CableLabs, Data-Over-Cable Service Interface Specifications DOCSIS 3.0 Security Specification, c. 2006-2007, Cable Television Laboratories, Inc., http://cablemodem.com/specifications/specifications30.html.

Stolowitz Ford Cowger LLP, Listing of Related Cases, Nov. 2, 2010.

Droms, "Dynamic Host Configuration Protocol", RFC 2131, Mar. 1997, 45 pgs.

\* cited by examiner

US 8,224,936 B2

CONFIGURATION FILE OVERRIDE

TECHNICAL FIELD

The present disclosure relates generally to the field networking.

BACKGROUND

Cable operators have widely deployed high-speed data services on cable television systems. These data services allow subscriber-side devices, such as personal computers, to communicate over an ordinary cable TV network Hybrid Fiber Coax (HFC) cable. A Cable Modem Termination System (CMTS) connects the cable TV network to a data network, such as the Internet.

For various reasons, such as when a particular cable modem is used to send malicious traffic, cable operators may desire to block a cable modem from sending the communications over the network. The disclosure that follows solves this and other problems.

DESCRIPTION OF EXAMPLE EMBODIMENTS

Overview

Figure 1:
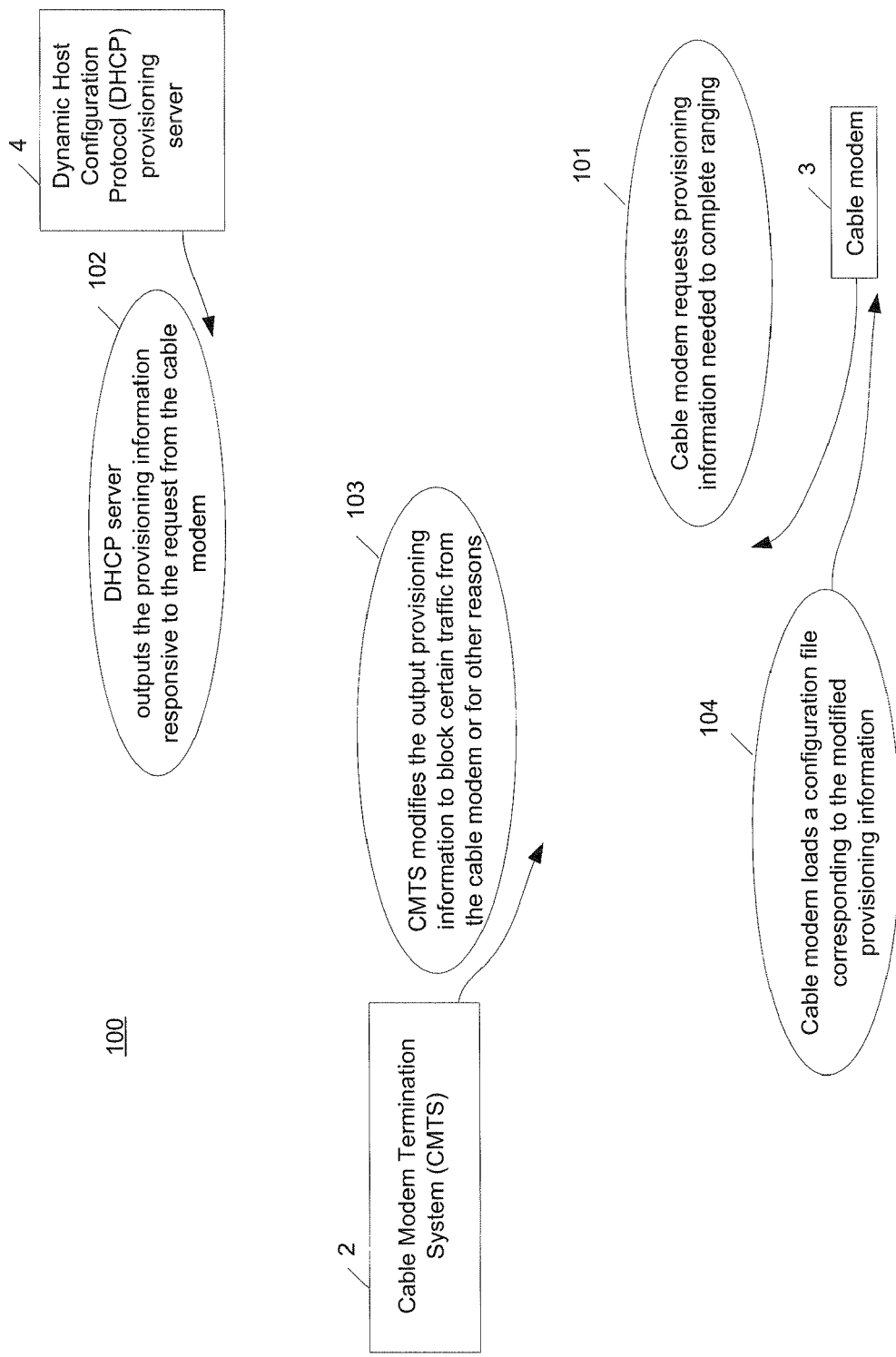
FIG. 1 illustrates an example system that can be used for blocking a cable modem from sending certain communications over a network.

In one embodiment, a router is configured to relay a provisioning request originating from a remote network device to a remote provisioning server. When the router receives back a provisioning response including provisioning information identifying a first remotely stored configuration file, the router is configured to modify the provisioning information such that the modified provisioning information no longer identifies the first remotely stored configuration file. The router then relays the provisioning reply, which may identify a second different configuration file, to the remote network device.

Description

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device. Only those parts of the various units are shown and described which are necessary to convey an understanding of the examples to those skilled in the art.

FIG. 1 illustrates an example system that can be used for blocking a cable modem from sending certain communications over a network.

Cable operators sometimes desire to prevent a cable modem 3 from communicating traffic from subscriber side devices onto the cable network. The cable operators may desire to prevent such traffic for any reason; such as if the cable modem 3 has a history of communicating denial of service attacks to the CMTS 2.

An initial step in bringing the cable modem 3 fully online, as illustrated by circle 101, is for the cable modem 3 to request provisioning information from the Dynamic Host Configuration Protocol (DHCP) server 4 or other provisioning server. The provisioning information, which is output by the DHCP server 4 as illustrated by circle 102, contains an address for the cable modem 3 and other information needed by the cable modem 3 to complete ranging. The cable modem 3 can therefore be blocked from communicating subscriber side traffic by controlling what provisioning information the DHCP server 4 outputs responsive to a provisioning request from the cable modem 3.

For business and other reasons; however, the cable operators do not control the operation of the DHCP server 4. Accordingly, the cable operators generally must coordinate with the operators of the DHCP server 4 to control what information the DHCP server 4 outputs responsive to a provisioning request from the cable modem 3. Such coordination takes time to complete, and before the coordination is complete, the cable modem 3 can obtain provisioning information and communicate traffic onto the cable network for some time period.

As will be explained in greater detail later by way of an example, the CMTS 2 acts as a relay agent for provisioning requests from the cable modem 3. Such relaying puts the CMTS 2 on the path for receiving requests from the cable modem and receiving responses from the DHCP server 4. During such relaying of a response output by the DHCP server 4, the software 9 causes the CMTS 2 to modify provisioning information included in the response as illustrated by circle 103. When the cable modem 3 loads a configuration file corresponding to the modified information as illustrated by circle 104, the cable modem 3 is prevented from communicating traffic from associated subscriber side devices. Accordingly, the modification by the CMTS 2 allows the traffic to be blocked without reconfiguring the DHCP server 4 and without coordinating with operators of the DHCP server 4.

Figure 2:
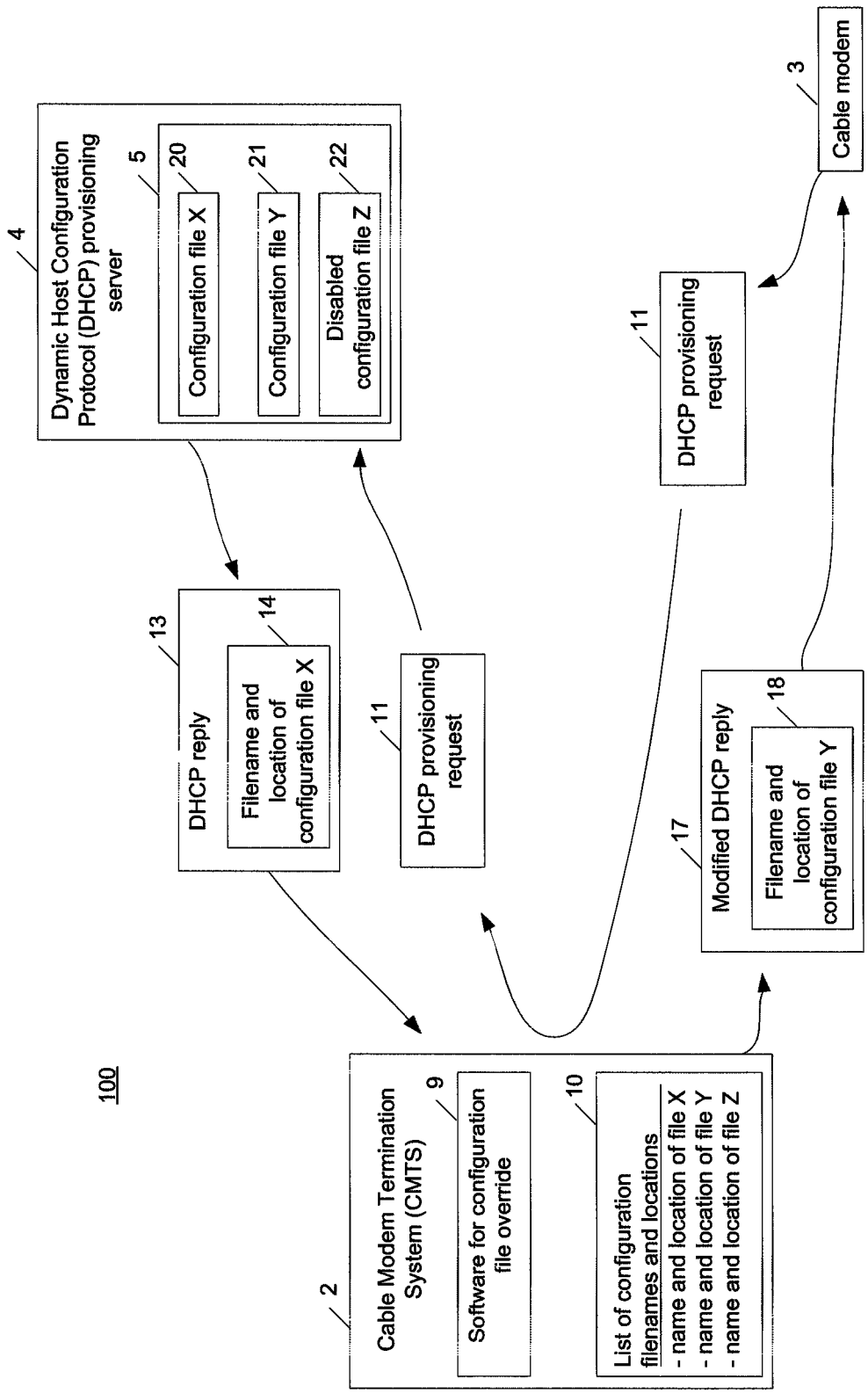
FIG. 2 illustrates the Cable Modem Termination System (CMTS) shown in FIG. 1.

FIG. 2 illustrates the Cable Modem Termination System (CMTS) shown in FIG. 1.

The cable modem 3 requests provisioning information by broadcasting a DHCP provisioning request 11, which can be a DHCP discovery message. The CMTS 2, configured as a relay agent, receives the broadcast request 11 and then relays the same to the DHCP server 4.

The DHCP server 4 receives the request and, according to an internal configuration table, selects a configuration file that corresponds to the cable modem 3. In the present example, the configuration files 20-22 are located on a Trivial File Transfer Protocol (TFTP) server 5 located on the DHCP server 4. It should be understood that the TFTP server 5 may be located remotely from the DHCP server 4 in other examples, and it should also be understood that the TFTP server 5 may dynamically generate the configuration files 20-22 in advance or responsive to receiving a relayed request. Three configuration files 20-22 are illustrated; however, it should be understood that the DHCP server 4 can select a configuration file from any number of configuration files. Next, the DHCP server 4 outputs a DHCP reply 13 containing provisioning information 14 for the selected configuration file 22. The provisioning information 14 includes a name of the configuration file X and the location for accessing the same on the DHCP server 4.

When the CMTS 2 receives the DHCP reply 13, the software 9 can prevent the cable modem 3 from coming fully online according to an input. The CMTS 2 contains a list 10 containing configuration filenames and corresponding locations on the TFTP server 5. The CMTS 2 selects one of the configuration filenames and corresponding locations from the list 10 according to configuration parameters included in the input. For example, if an input requests blocking the cable modem 3 from coming fully online, the software 9 replaces the filename and TFTP server location for an enabled configuration file X with the filename and TFTP server location for a disabled configuration file Z. In the present example, the disabled configuration file Z is a Data Over Cable Service Interface Specification (DOCSIS) configuration file with the disabled option selected. In the present example where the provisioning server 4 communicates using a DHCP protocol, the software 9 modifies the "filename" field and/or "siaddr" field of the DHCP reply.

If the name and location of disabled configuration file Z is missing from the list 10, the software 9 dynamically can create a disabled configuration file. The name and location of the configuration file Z can be absent from the list for various reasons, such as if there is no disabled configuration file stored on the TFTP server 5 for the cable modem 3. In any case, the software 9 provides the configuration file by causing an internal TFTP server or other configuration file generator to dynamically create the disabled configuration file, which is then stored locally on the CMTS 2. In such a case, the modified DHCP reply 17 points to the locally stored configuration file.

Thereafter, the software 9 forwards the modified DHCP reply 17 including the provisioning information 18 pointing to the disabled configuration file Z. When the cable modem 3 receives the DHCP reply 17, the cable modem 3 will load the disabled configuration file Z and be prevented from communicating subscriber side traffic over the cable network.

In the above example, the software 9 overrode the provisioning of an enabled configuration file X with the disabled configuration file Z. However, in other examples the software 9 can override the provisioning of any configuration file with a different type of configuration file.

For example, the software 9 can override a default configuration file associated with a first maximum bandwidth to provide a cable modem 3 with a second greater maximum bandwidth. If a customer associated with cable modem 3 contacts the cable operator regarding dissatisfaction with connection speed, the cable modem 3 could be reset to load a different configuration file with a greater maximum bandwidth. Thereafter, the cable modem 3 would be loaded with the premium configuration file for a period of time, allowing the customer to experience improved service. It should be understood that the bandwidth increase can thus be obtained without coordinating with the DHCP server 4 operators or without modifying the DHCP server 4.

In another example, the software 9 can be used to override a default configuration file for a particular cable modem with a different configuration file for troubleshooting purposes. Overriding the default configuration file for the cable modem 3 can isolate performance issues to other hardware besides the customer's cable modem 3. In another example, the software 9 can be used to provide additional bandwidth for a preferred customer. In yet another example, the software 9 can be used to quickly change a configuration of a group of cable modems.

Figure 3:
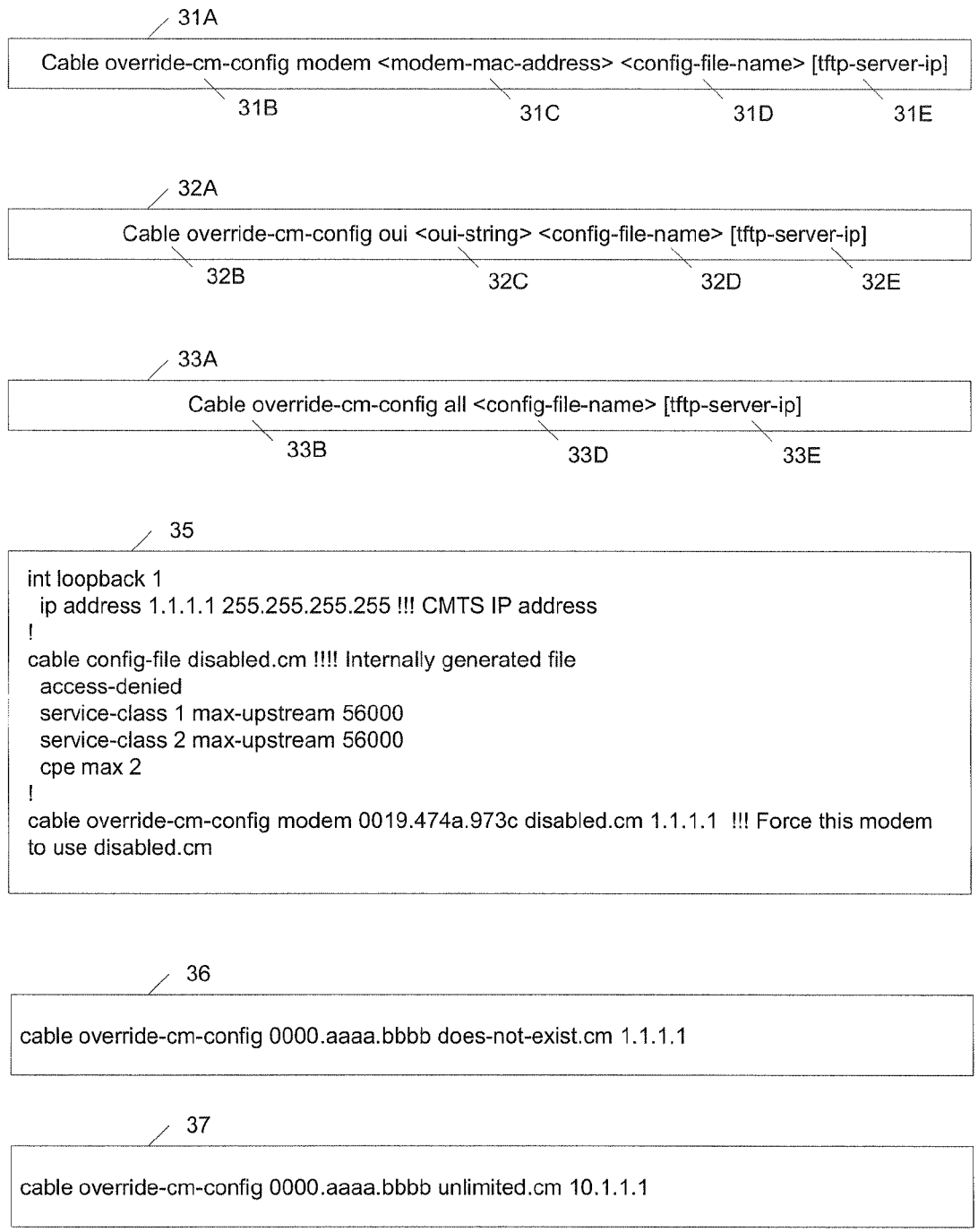
FIG. 3 illustrates command lines that can be used to control the CMTS shown in FIGS. 1 and 2.

FIG. 3 illustrates command lines that can be used to control the CMTS shown in FIGS. 1 and 2.

The box 31A includes an example of a Command Line Interface (CLI) instruction that can be input to the CMTS 2 to cause the software 9 to modify provisioning information for a single cable modem. A command 31B is associated with a cable modem Media Access Control (MAC) address 31C, a replacement configuration file name 31D, and a location 31E of the replacement configuration file.

The box 32A includes an example of a CLI instruction that can be input to the CMTS 2 to cause the software 9 to modify provisioning information for a group of cable modems sharing a common Organizational Unique Identifier (OUI) or other manufacturer ID. A command 32B is associated with the OUI 32C, a replacement configuration file name 32D, and a location 32E of the replacement configuration file.

The box 33A includes an example of a CLI instruction that can be input to the CMTS 2 to cause the software 9 to modify provisioning information for all downstream cable modems. A command 33B is associated a replacement configuration file name 33D, and a location 33E of the replacement configuration file.

The box 35 includes example CLI instructions that can be used to cause the software 9 to control a local TFTP server of other configuration file generator to generate a disabled configuration file. The example instructions in the box 35 cause a downstream cable modem to load the locally generated disabled configuration file.

The box 36 includes an example CLI instruction that can be used to cause the software 9 to modify provisioning information to point to a nonexistent or invalid configuration file. The cable modem will attempt to download the nonexistent configuration file, which prevents the cable modem from completing ranging.

Although it is possible to point a cable modem to a nonexistent or invalid configuration file as explained above, it may be preferable to generally point target cable modems to a disabled configuration file. For example, like an invalid configuration file, a disabled configuration file prevents network access through the cable modem by subscriber side devices such as a personal computer or any other customer premise equipment. However, in contrast to a disabled configuration file, cable operators can still control and monitor the cable modem for network management purposes. In contrast, a cable modem pointed to a nonexistent or invalid configuration file would "hang" in the configuration file download state, unable to complete ranging.

The box 37 includes an example CLI instruction that can be used to cause the software 9 to modify provisioning information to temporarily provide a cable modem with different bandwidth maximums. As explained previously, this capability provides several advantages. Preferred customers can be given a bandwidth boost, a cable operator could reduce the bandwidth as an initial response to a malicious user, a particular cable modem or a particular model of cable modem could have its speed adjusted for troubleshooting purposes, etc.

It should be understood that the software 9 can be configured to monitor for broadcast discoveries and/or DHCP responses associated with particular cable modem(s) responsive to receiving one of the example inputs described above or any other input. The software 9 can be configured to monitor and subsequently modify provisioning information until a new command is received. Alternatively, the software 9 can be configured to monitor and subsequently modify provisioning information for a predefined period of time. The predefined period of time can be any amount, for example an amount corresponding with a procedure for contacting the DHCP server 4 operators and making changes to the internal tables and/or configuration files on the DHCP server 4.

Figure 4:
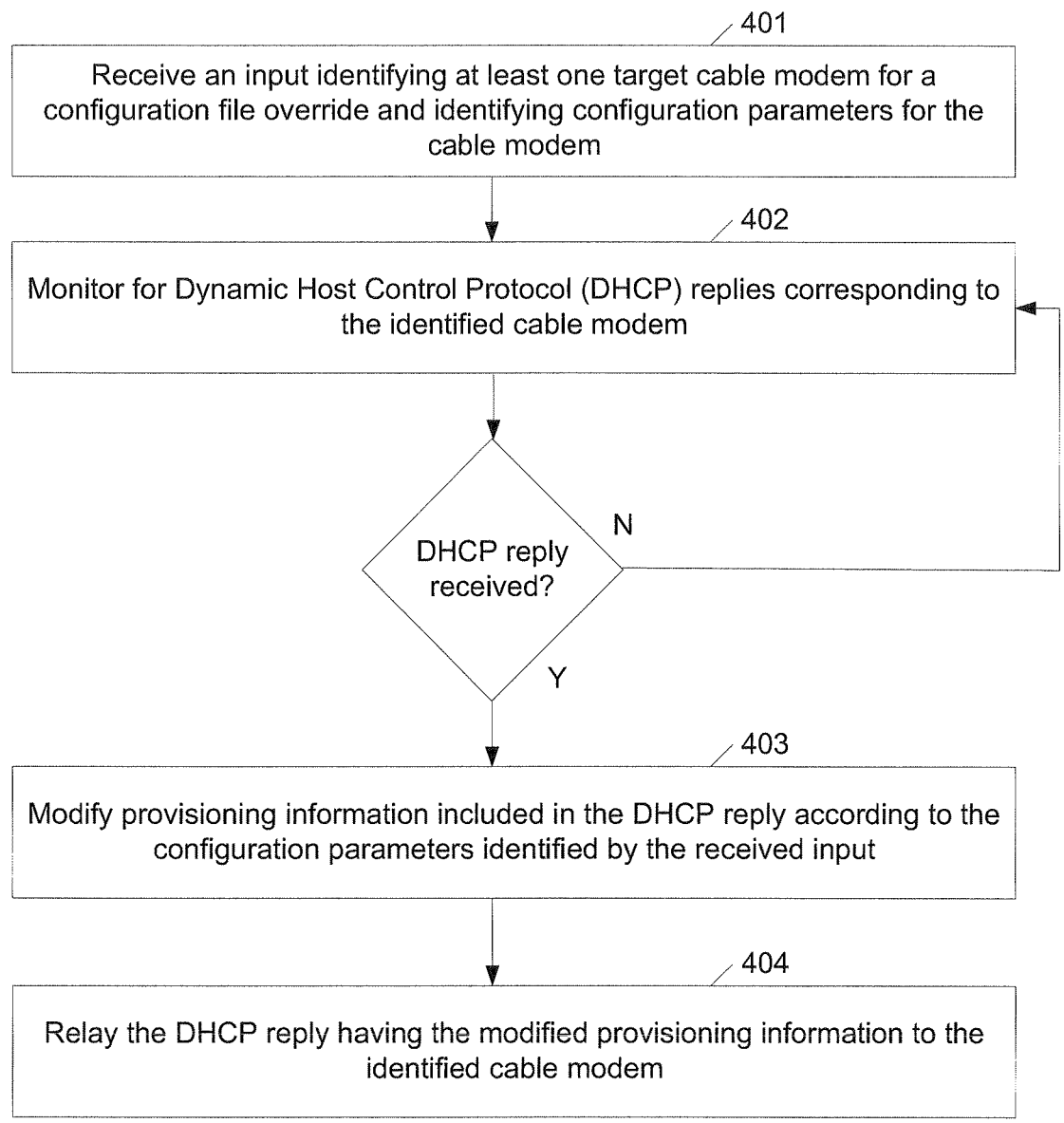
FIG. 4 illustrates an example method for using the CMTS illustrated in FIGS. 1 and 2.

FIG. 4 illustrates an example method for using the CMTS illustrated in FIGS. 1 and 2.

In block 401, the CMTS 2 receives an input identifying at least one target cable modem for a configuration file override, and identifying configuration parameters for the target cable modem. In block 402, the CMTS 2 monitors for DHCP replies corresponding to the identified cable modem.

If a DHCP reply for the target cable modem is detected, in block 403 the CMTS 2 modifies provisioning information included in the DHCP reply according to the received input. In other words, provisioning information for downloading a first configuration file that the DHCP server associates with the target cable modem is overwritten with provisioning for a second configuration file that the DHCP server does not necessarily associate with the target cable modem. In block 404, the CMTS 2 relays the DHCP reply having the modified provisioning information to the target cable modem. Thereafter, responsive to receiving the modified configuration file the cable modem will load the second configuration file.

Several examples have been described above with reference to the accompanying drawings. Various other examples of the invention are also possible and practical. The system may be exemplified in many different forms and should not be construed as being limited to the examples set forth above.

For example, the principles described above are not limited to cable modems and can be applied to any router or other provisioning relay agent. As one alternative example, a router associated with an Internet Protocol (IP) phone can relay a provisioning request (a DHCP provisioning request or otherwise) to a provisioning server. Thereafter, the router can modify provisioning information included in a corresponding provisioning reply. Thus, the router can control which configuration file is accessed by the IP phone without reconfiguring the provisioning server. It should be understood that the provisioning server can be reconfigured in due course so as to relieve the router from the processing load associated with continuing to override provisioning responses for the IP phone.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An apparatus, comprising:
   one or more processors; and
   a memory including instructions executable by the processors, the processors when executing the instructions operable to:
   receive an input identifying provisioning parameters for a remote network device;
   relay a provisioning request originating from the remote network device, the provisioning request relayed to a remote provisioning server;
   receive a provisioning reply from the remote provisioning server, the provisioning reply including provisioning information identifying a first configuration file stored remotely with respect to the apparatus;
   modify the provisioning information such that the modified provisioning information no longer identifies the first remotely stored configuration file and instead identifies a second different configuration file, the second different configuration file corresponding to the identified provisioning parameters; and
   relay the provisioning reply having the modified provisioning information to the remote network device;
   wherein the relayed provisioning reply is sent from a Cable Modem Termination System (CMTS) to a cable modem and is configured to prevent the cable modem from completing ranging with the CMTS.

2. The apparatus of claim 1, wherein the first configuration file is enabled and the second configuration file is disabled.

3. The apparatus of claim 1, wherein the second configuration file identified by the modified provisioning information does not exist on the remote provisioning server.

4. The apparatus of claim 1, wherein the first configuration file is configured to, if loaded by a cable modem, enable a first maximum communication bandwidth for the cable modem, and the second configuration file is configured to, if loaded by the cable modem, enable a second different maximum communication bandwidth for the cable modem.

5. The apparatus of claim 1, wherein the second configuration file identified in the modified provisioning response is stored on the remote provisioning server but unassociated with the remote network device by the remote provisioning server.

6. The apparatus of claim 1, wherein a filename of the modified provisioning information points to a non-existent or invalid configuration file.

7. A method, comprising:
   receiving, at a relay device, an input identifying provisioning parameters for a network device;
   relaying, from the relay device, a provisioning request originating from the network device, the provisioning request relayed to a provisioning server;
   receiving, at the relay device, a provisioning reply from the provisioning server, the provisioning reply including provisioning information identifying a first configuration file stored on the provisioning server;

modifying, using the relay device, the provisioning information such that the modified provisioning information no longer identifies the first configuration file stored on the provisioning server and instead identifies a second different configuration file, the second different configuration file corresponding to the identified provisioning parameters; and relaying, from the relay device, the provisioning reply having the modified provisioning information to the network device;

wherein the relayed provisioning reply is sent from a Cable Modem Termination System (CMTS) to a cable modem and is configured to prevent the cable modem from completing ranging with the CMTS.

8. The method of claim 7, wherein the first configuration file is enabled and the second configuration file is disabled.

9. The method of claim 8, wherein the second disabled configuration file is configured to, when loaded by the cable modem, bring the cable modem online but prevent customer premise equipment connected to the cable modem from accessing a cable network.

10. The method of claim 7 wherein the second configuration file identified by the modified provisioning information does not exist on the provisioning server.

11. The method of claim 7, wherein the first configuration file is configured to, if loaded by the cable modem, enable a first maximum communication bandwidth for the cable modem, and the second configuration file is configured to, if loaded by the cable modem, enable a second different maximum communication bandwidth for the cable modem.

12. The method of claim 7, wherein both the first and second configuration files are stored on the provisioning server, wherein the first configuration file is associated with the network device by the provisioning server, wherein the second configuration file is unassociated with the network device by the provisioning server.

13. The method of claim 7, further comprising dynamically generating the second configuration file, the second configuration file dynamically generated independently of the provisioning server.

14. The method of claim 7, wherein the second configuration file comprises an invalid configuration file, a disabled configuration file, or a limited configuration file enabling less bandwidth than the first configuration file.

15. A Cable Modem Termination System (CMTS), comprising:
a processing device configured to:
relay a provisioning request sent from a cable modem, the provisioning request relayed to a provisioning server;
receive a reply from the provisioning server, the reply including provisioning information including both a filename and location corresponding to a first configuration file stored remotely from the CMTS;
modify at least one of the filename or location of the provisioning information, wherein after modifying at least one of the filename or location the provisioning information corresponds to a second configuration file that is different than the first configuration file; and
relay the reply including the provisioning information having at least one of the modified filename or location to the cable modem;
wherein the relayed reply is sent from the CMTS to the cable modem and is configured to prevent the cable modem from completing ranging with the CMTS.

16. The CMTS of claim 15, wherein the CMTS controls which one of a plurality of remotely stored second configuration files is loaded on the cable modem.

17. The CMTS of claim 15, wherein the processing device is configured to modify a Dynamic Host Configuration Protocol (DHCP) filename field and a DHCP siaddr field of the reply before relaying the reply.

18. The CMTS of claim 15, wherein the processing device is configured to:
identify provisioning replies corresponding to a group of cable modems having a common Organizational Unique Identifier (OUI); and
include the same provisioning information in the identified provisioning replies.

19. The CMTS of claim 15, wherein the second configuration file comprises an invalid configuration file, a disabled configuration file, or a limited configuration file enabling less bandwidth than the first configuration file.

20. The CMTS of claim 15, wherein the first configuration file is stored on a remote DHCP server and the second configuration file is not stored on the remote DHCP server.

* * * * *